(12) United States Patent
Ventura et al.

(10) Patent No.: US 7,147,261 B2
(45) Date of Patent: Dec. 12, 2006

(54) SEAT TRACK ASSEMBLY FOR A MOTOR VEHICLE HAVING AN INTEGRATED POSITION SENSOR

(75) Inventors: Kevin J. Ventura, Grosse Pointe Park, MI (US); Stephen P. Tokarz, New Boston, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/484,365

(22) PCT Filed: Jul. 18, 2002

(86) PCT No.: PCT/US02/22974

§ 371 (c)(1),
(2), (4) Date: Jul. 9, 2004

(87) PCT Pub. No.: WO03/008227

PCT Pub. Date: Jan. 30, 2003

(65) Prior Publication Data

US 2004/0239086 A1 Dec. 2, 2004

Related U.S. Application Data

(60) Provisional application No. 60/306,347, filed on Jul. 18, 2001.

(51) Int. Cl.
*B60N 2/42* (2006.01)
*B60N 2/07* (2006.01)

(52) U.S. Cl. .................................. 296/65.13; 296/68.1

(58) Field of Classification Search ............. 296/65.01, 296/68.1, 65.13, 65.14; 428/429, 224, 550; 248/429, 550

See application file for complete search history.

(56) References Cited

U.S. PATENT DOCUMENTS

| | | | |
|---|---|---|---|
| 4,909,560 A | 3/1990 | Ginn | |
| 5,074,583 A | 12/1991 | Fujita et al. | |
| 5,842,283 A | 12/1998 | Yatsu et al. | |
| 5,893,582 A | 4/1999 | Allen et al. | |
| 5,967,549 A | 10/1999 | Allen et al. | |
| 6,053,529 A | 4/2000 | Frusti et al. | |
| 6,188,940 B1 | 2/2001 | Blackburn et al. | |
| 6,240,352 B1 | 5/2001 | McCurdy | |
| 6,243,634 B1 | 6/2001 | Oestreicher et al. | |
| 6,270,115 B1 | 8/2001 | Andreen et al. | |
| 6,275,026 B1 | 8/2001 | Becker | |
| RE37,466 E | 12/2001 | Allen et al. | |
| 6,351,994 B1* | 3/2002 | Pinkos et al. | ............... 73/432.1 |
| 6,561,542 B1* | 5/2003 | Chitalia et al. | ............. 280/734 |
| 6,593,735 B1* | 7/2003 | Becker | .................. 324/207.26 |
| 6,767,029 B1* | 7/2004 | Jaudouin et al. | ............ 280/735 |

(Continued)

*Primary Examiner*—D. Glenn Dayoan
*Assistant Examiner*—Paul Chenevert
(74) *Attorney, Agent, or Firm*—Clark Hill PLC

(57) ABSTRACT

A seat track assembly for a seat of a motor vehicle having a floor and an airbag. The seat track assembly includes a stationary rail fixedly secured to the floor. The seat track assembly also includes a movable rail fixedly secured to the seat and slidably engaged with the stationary rail to move the seat therealong. The movable rail extends along a length between a forward position and a rearward position. A shunt defining an elongated body extends along a portion of the length of the movable rail. A sensor is fixedly secured to the stationary rail and disposed adjacent the shunt to produce a position signal indicating a position of the sensor relative to the shunt. The sensor and the shunt are disposed within the stationary and movable rails to be protected thereby.

22 Claims, 2 Drawing Sheets

U.S. PATENT DOCUMENTS

| | | | |
|---|---|---|---|
| 6,784,774 B1 * | 8/2004 | Okumura | 335/205 |
| 6,854,782 B1 * | 2/2005 | Reichert et al. | 296/65.13 |
| 2001/0025214 A1 | 9/2001 | Isonaga et al. | |
| 2002/0145418 A1 * | 10/2002 | Becker | 324/207.2 |
| 2004/0100388 A1 * | 5/2004 | Yoshida et al. | 340/686.1 |
| 2004/0130176 A1 * | 7/2004 | Reichert et al. | 296/65.13 |
| 2004/0251723 A1 * | 12/2004 | Endo et al. | 297/284.1 |

* cited by examiner

US 7,147,261 B2

SEAT TRACK ASSEMBLY FOR A MOTOR VEHICLE HAVING AN INTEGRATED POSITION SENSOR

This application claims the benefit of U.S. Provisional Application No. 60/306,347, filed Jul. 18th, 2001.

BACKGROUND OF THE INVENTION

1. Field of the Invention

The invention relates to a seat track assembly for seat of a motor vehicle. In particular, this invention relates to a seat track assembly having a sensor integrated into a track system thereof for identifying a plurality of positions for the seat.

2. Background of the Invention

A seat track assembly extends along a floor of a motor vehicle and supports a seat thereabove. Typically, the seat track assembly includes a stationary rail secured to a floor and a movable rail secured to the seat. The movable rail slidingly engages the stationary rail to move the seat between a plurality of positions. The plurality of positions allows the seat to be adaptable for use by persons of different heights. For example, the seat may be moved to a forward position closer to a steering wheel to give a driver greater control over the steering wheel or to allow the driver to reach the control pedals with their feet. Alternatively, the seat may be moved to the forward position to create extra cargo space behind the seat or to accommodate taller occupants of a rear seat.

The position of the seat can influence the effectiveness of an airbag system. Airbag systems, which include an airbag stored in a housing, are installed throughout a passenger compartment to absorb a collision shock created upon motor vehicle impact. For example, the airbag can be stored within the steering wheel or an instrument panel for the safety of an occupant of the motor vehicle. The airbag inflates with gas in response to a signal generated by a sensor upon motor vehicle impact. Typically, the inflation of the airbag occurs at a high deployment rate so that the airbag is deployed immediately upon motor vehicle impact. But when the seat is in the forward position, a lower deployment rate is desired to reduce the risk of injury to the occupant thereof.

Systems to control the deployment rate of the airbag based upon the position of the seat are known to those skilled in the art. U.S. Pat. No. 6,053,529 to Frusti et al. discloses a deployable passenger restraint system for a motor vehicle having a seat mounted on a seat track assembly. The seat track assembly includes a movable rail that slides relative to a stationary rail. The system includes a sensor flange having a predetermined length secured along an outer surface of the movable rail, and a sensor extending out from the stationary rail. As the movable rail slides along the stationary rail to move the seat, the sensor detects the absence or presence of the sensor flange and generates a signal representing the position of the seat. The signal is sent to a processor, which increases or decreases the deployment rate of a deployable restraint depending upon the position of the seat.

SUMMARY OF THE INVENTION

A seat track assembly for a seat of a motor vehicle having a floor and an airbag includes a stationary rail fixedly secured to the floor. The seat track assembly also includes a movable rail fixedly secured to the seat and slidably engaged with the stationary rail to move the seat therealong. The movable rail extends along a length between a forward position and a rearward position. A shunt defining an elongated body extends along a portion of the length of the movable rail. A sensor is fixedly secured to the stationary rail and disposed adjacent the shunt to produce a position signal indicating a position of the sensor relative to the shunt. The sensor and the shunt are disposed within the stationary and movable rails to be protected thereby.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
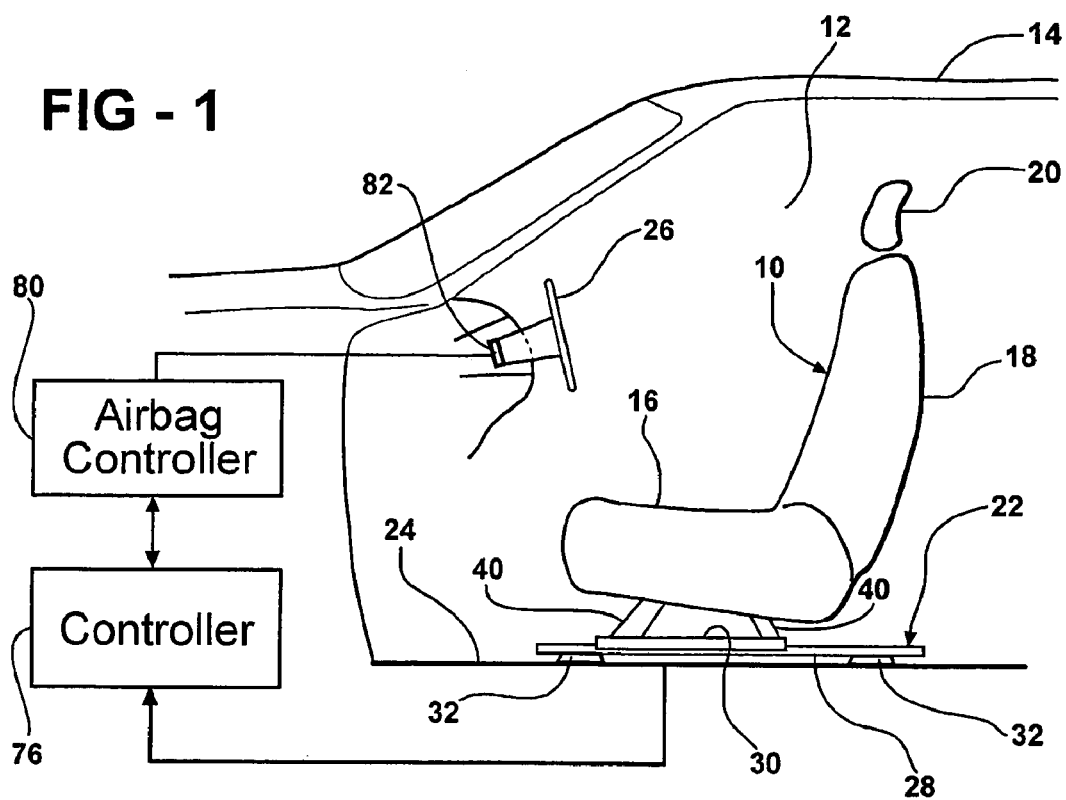
FIG. 1 is a side schematic view of a seat and a seat track assembly positioned within a passenger compartment of a motor vehicle.

Referring to the Figures, a seat, generally shown at 10, is positioned within a passenger compartment 12 of a motor vehicle 14. The seat 10 includes a seat cushion 16, a seat back 18, and a head restraint 20 for supporting an occupant of the motor vehicle 14 thereon. Although the seat 10 shown in FIG. 1 is a driver side front seat, it is contemplated that the description below is equally applicable to a passenger side front seat or to additional seats positioned throughout the passenger compartment 12.

A seat track assembly, generally indicated at 22, extends along a floor 24 of the motor vehicle 14 and supports the seat 10 thereabove. The seat track assembly 22 allows for movement of the seat 10 between a forward position, in which the seat 10 is in close proximity to a steering wheel 26, a rearward position, in which the seat 10 is away from the steering wheel 26, and various intermediate positions therebetween. Movement of the seat 10 allows the seat 10 to be adaptable for occupants of different heights. For example, the seat 10 may be moved to the forward position to allow a driver to reach control pedals (not shown) with their feet. In addition, the seat 10 may be moved to the forward position to create extra cargo space behind the seat 10, or to accommodate taller occupants of rear seats (not shown). Movement of the seat 10 may be achieved manually or through a power system (not shown).

The seat track assembly 22 includes a stationary rail 28 and a movable rail 30. The stationary rail 28 is fixedly secured to the floor 24 by a plurality of floor brackets 32. The stationary rail 28 includes inner sides 34 and a lower cross member 36 extending between the inner sides 34. Each of the inner sides 34 defines an arcuate end 38 for engaging the movable rail 30 to slide the seat 10 therealong.

The movable rail 30 is fixedly secured to the seat 10 by seat brackets 40. The movable rail 30 extends along a length between a forward position and a rearward position. The movable rail 30 includes outer sides 42 and an upper cross member 44 extending between the outer sides 42. The outer sides 42 define U-shaped ends 46, which engage the arcuate end 38 of the inner sides 32 as the movable rail 30 slides along the stationary rail 28. A stop 48 extends down from the movable rail 30 to limit movement thereof relative to the stationary rail 28.

A shunt, generally shown at 50, defines an elongated body 52 extending along a portion of the length of the movable rail 30. The shunt 50 is fixedly secured to the upper cross member 44 by a securing flange 54. Rivets 56 hold the securing flange 54 to the upper cross member 44. The shunt 50 is positioned between the outer sides 42 of the movable rail 30. This positioning protects the shunt 50 from wear and tear that might otherwise cause weakening of the attachment of the shunt 50 to the movable rail 30.

The shunt 50 includes a ferromagnetic surface 58 and a non-ferromagnetic surface 60 extending along the elongated body 52. The shunt 50 defines an interface 59 where the ferromagnetic surface 58 and the non-ferromagnetic surface 60 meet. In the embodiment shown in the Figures, the ferromagnetic surface 58 extends along approximately forty percent (40%) of the elongated body 52 and the non-ferromagnetic surface 60 extends along approximately sixty percent (60%) of the elongated body 52. The percentages of the ferromagnetic surface 58 and the non-ferromagnetic surface 60 will, however, vary depending on the specific implementation of the invention.

In the preferred embodiment, the shunt 50 has a thin steel support 62 extending therealong. The steel support 62 is used for the ferromagnetic surface 58. The non-ferromagnetic surface 60 is a thermoplastic material that is molded over the steel support 62. It should be appreciated by those skilled in the art that the steel support 62 does not have to extend along the entire shunt 50, and that the non-ferromagnetic surface 60 may be fabricated to support itself.

Figure 3:
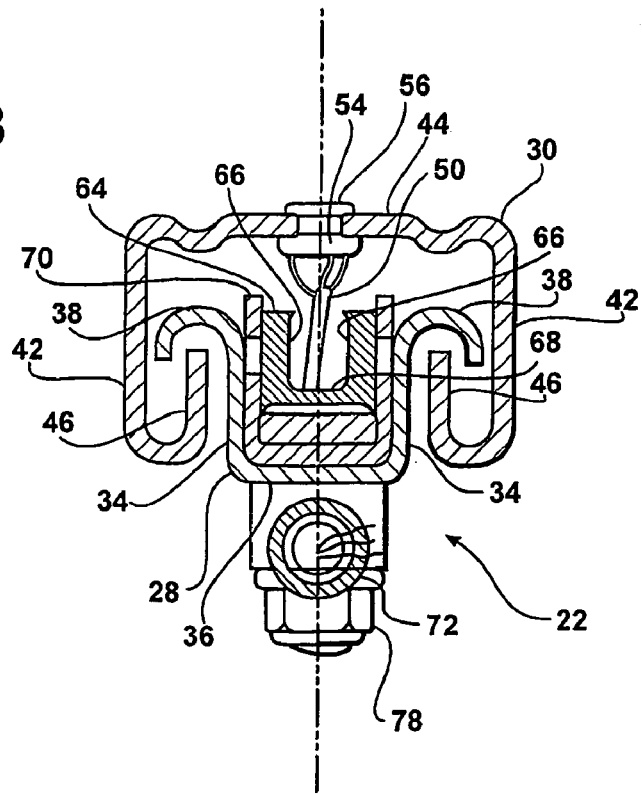
FIG. 3 is a cross-sectional view taken along lines 3—3 of FIG. 2.
Figure 2:
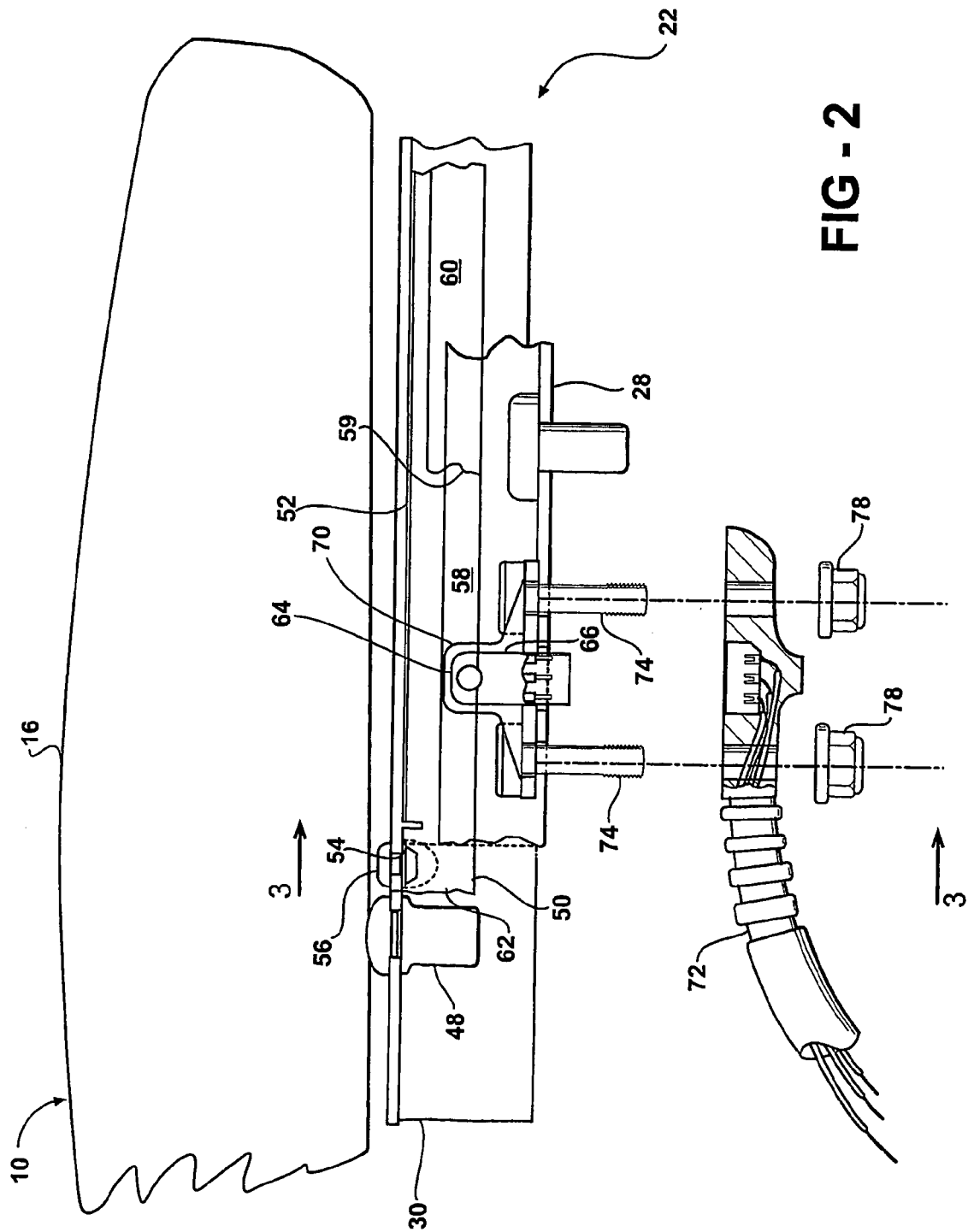
FIG. 2 is a side view, partially exploded and cut away, of a seat track assembly of one embodiment of the invention.

A sensor 64 is operatively secured to the stationary rail 28. The sensor 64 is an Optek Hall effect sensor having a U-shape configuration when viewed from the end shown in FIG. 3. The sensor 64 measures the magnetic field strength surrounding it. The sensor 64 includes a sensor cross member 68 and sensor sides 66 extending perpendicularly therefrom. The sensor sides 66 extend up on either side of the shunt 50 so that the sensor 64 is disposed adjacent the shunt 50.

Depending on where the sensor 64 is along the length of the shunt 50 will determine the strength of the magnetic field which will, in turn, identify the position of the seat 10. A sensor bracket 70, which is preferably a stamped metal bracket, holds the sensor sides 66 and the sensor cross member 68 in place relative to each other. The sensor bracket 70 also fixedly secures the sensor 64 to the lower cross member 36 so that the sensor 64 is disposed within the inner sides 34 of the stationary rail 28. Thus, the sensor 64 is protected from the environment outside of the seat track assembly 20.

Alternatively, it will be appreciated that the shunt 50 can be secured within the stationary rail 28 so that the elongated body 52 extends along a portion of a length thereof, and that the sensor 64 can be secured within the movable rail 30.

A wire harness 72 is secured to the sensor 64 with fasteners 74. The wire harness 72 provides power to the sensor 64 from a power source (not shown). In the embodiment shown, the fasteners 74 are bolts that are tightened in place using nuts 78. It should be appreciated by those skilled in the art that any fastener that is capable of withstanding the environment may be used in place of the bolts 74 and the nuts 78. The sensor 64 and the fasteners 74 must be secure enough to act as a limiter. More specifically, the sensor 64 will abut the stop 48 to prevent the movable rail 30 from moving therepast.

In operation, when the sensor 64 senses the presence of the ferromagnetic surface 58, the sensor 64 will transmit the position signal through a signal conductor in the wire harness 72 to a controller 76. Depending on how the controller 76 is programmed, the position signal will identify the seat 10 as being forward or rearward of a position identified by the interface 59 where the ferromagnetic surface 58 meets the non-ferromagnetic surface 60. As should be appreciated by those skilled in the art, the position signal is either present or not, i.e., a digital signal, and to what seat position (forward or rearward) the position signal is assigned to is a design choice.

If the seat 10 is identified as being in the forward position, the controller 76 transmits a control signal to an airbag controller 80, which will then generate an airbag control signal to reduce the deployment rate of an airbag 82. Conversely, if the seat 10 is identified as being in the rearward position, the controller 76 will transmit a control signal to the airbag controller 80, which will then generate an airbag control signal to increase the deployment rate of the airbag 82.

Although the foregoing description has been described in relation to the seat 10 of a motor vehicle 14, it will be readily apparent to those skilled in the art that the invention could be installed in conjunction with any type of seat for any vehicle.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A seat track assembly for a seat of a motor vehicle having a floor and an airbag, said seat track assembly comprising:
   a stationary rail fixedly secured to the floor;
   a movable rail fixedly secured to the seat and slidably engaged with said stationary rail to move the seat therealong, said movable rail extending along a length between a forward position and a rearward position;
   a shunt defining an elongated body extending longitudinally along a portion of said length of said movable rail, said elongated body comprising a metallic strip having a portion thereof completely encased in a thermoplastic material along the longitudinal length of the metallic strip thereby defining a ferromagnetic surface adjacent a non-ferromagnetic surface; and
   a magnetic sensor fixedly secured to said stationary rail and disposed adjacent said shunt to determine a magnetic field strength and responsively produce a position signal indicating a position of said sensor relative to said shunt whereby said sensor sand said shunt are disposed within said stationary and movable rails to be protected thereby.

2. A seat track assembly as set forth in claim 1 wherein said stationary rail includes inner sides and a lower cross member extending between said inner sides.

3. A seat track assembly as set forth in claim 2 wherein said sensor is secured to said stationary rail between said inner sides.

4. A seat track assembly as set forth in claim 3 wherein said sensor includes a sensor cross member and sensor sides extending perpendicularly therefrom.

5. A seat track assembly as set forth in claim 4 wherein said sensor sides extend up on either side of said shunt.

6. A seat track assembly as set forth in claim 5 wherein said non-ferromagnetic surface is disposed adjacent to and co-planar with said ferromagnetic surface.

7. A seat track assembly as set forth in claim 6 wherein said shunt defines an interface between said ferromagnetic surface and said non-ferromagnetic surface.

8. A seat track assembly as set forth in claim 7 wherein said sensor is fixedly secured to said lower cross member.

9. A seat track assembly as set forth in claim 8 wherein said sensor includes a sensor bracket for fixedly securing said sensor to said stationary rail.

10. A seat track assembly as set forth in claim 9 wherein said movable rail includes outer sides and an upper cross member.

11. A seat track assembly as set forth in claim 10 wherein said shunt is positioned between said outer sides.

12. A seat track assembly as set forth in claim 11 wherein said shunt is fixedly secured to said upper cross member.

13. A seat track assembly as set forth in claim 12 wherein said shunt includes a flange for fixedly securing said shunt to said movable rail.

14. A seat track assembly as set forth in claim 13 wherein said movable rail includes a stop extending therethrough.

15. A seat track assembly as set forth in claim 1 wherein said shunt has a ratio of ferromagnetic surface to non-ferromagnetic surface of about 40 to 60.

16. A seat track assembly for a seat of a motor vehicle having a floor and an airbag, said seat track assembly comprising:
   a stationary rail fixedly secured to the floor and extending along a length between a front end and a back end;
   a shunt fixedly secured to said stationary rail, said shunt defining an elongated body extending longitudinally along a portion of said length of said stationary rail, said elongated body comprising a metallic strip having a portion thereof completely encased in a thermoplastic material along the longitudinal length of the metallic strip thereby defining a ferromagnetic surface adjacent a non-ferromagnetic surface;
   a movable rail fixedly secured to the seat and slidably engaged with said stationary rail to move the seat therealong; and
   a magnetic sensor disposed adjacent said shunt to determine a magnetic field strength and responsively produce a position signal indicating a position of said sensor relative to said shunt whereby said sensor and said shunt are disposed within said stationary and movable rails to be protected thereby.

17. A seat track assembly as set forth in claim 16 wherein said shunt defines an interface between said ferromagnetic surface and said non-ferromagnetic surface.

18. A seat track assembly as set forth in claim 17 wherein said movable rail includes outer sides and an upper cross member.

19. A seat track assembly as set forth in claim 18 wherein said sensor is fixedly secured to said movable rail.

20. A seat track assembly as set forth in claim 19 wherein said sensor is positioned between said outer sides.

21. A seat track assembly as set forth in claim 20 wherein said sensor includes a sensor cross member and sensor sides extending perpendicularly therefrom.

22. A seat track assembly as set forth in claim 21 wherein said sensor sides extend down on either side of said shunt.

* * * * *